No. 656,695. Patented Aug. 28, 1900.
M. A. JACQUES.
APPARATUS FOR DEGREASING WOOL.
(Application filed Feb. 24, 1900.)
(No Model.)
3 Sheets—Sheet 1.
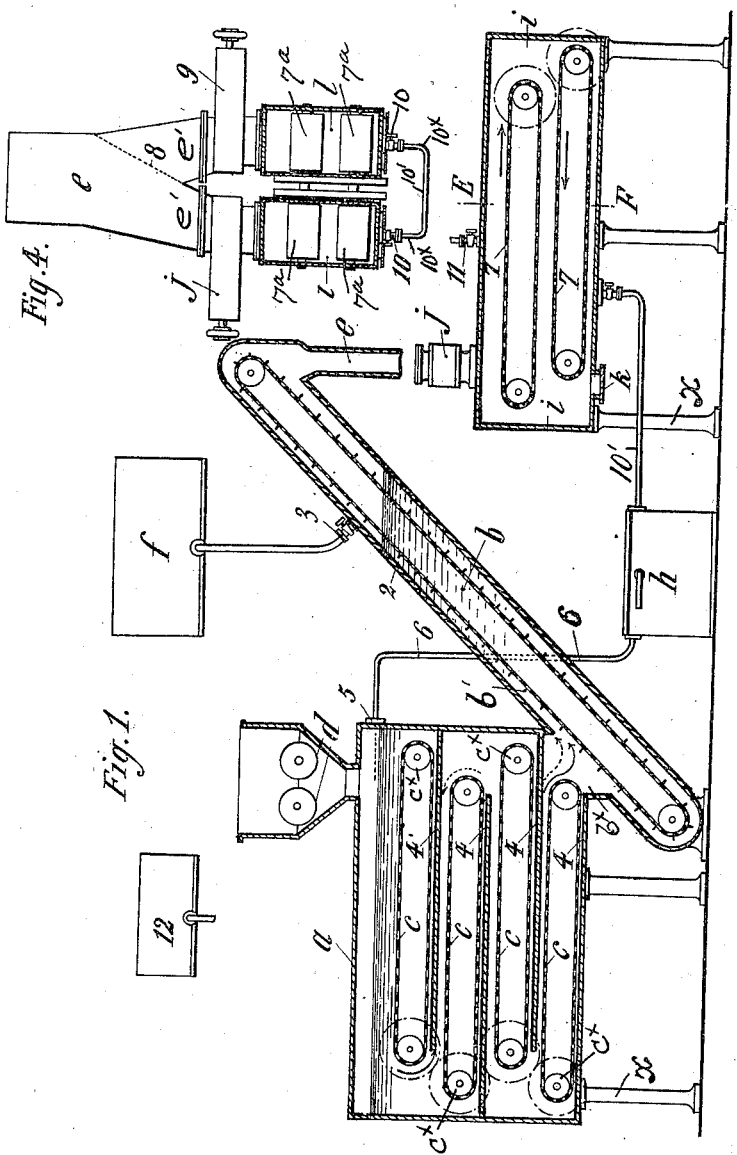
WITNESSES:
INVENTOR
Maximilien Auguste Jacques
BY
Richardson
ATTORNEYS
THE NORRIS PETERS CO., PHOTO-LITHO., WASHINGTON, D. C.

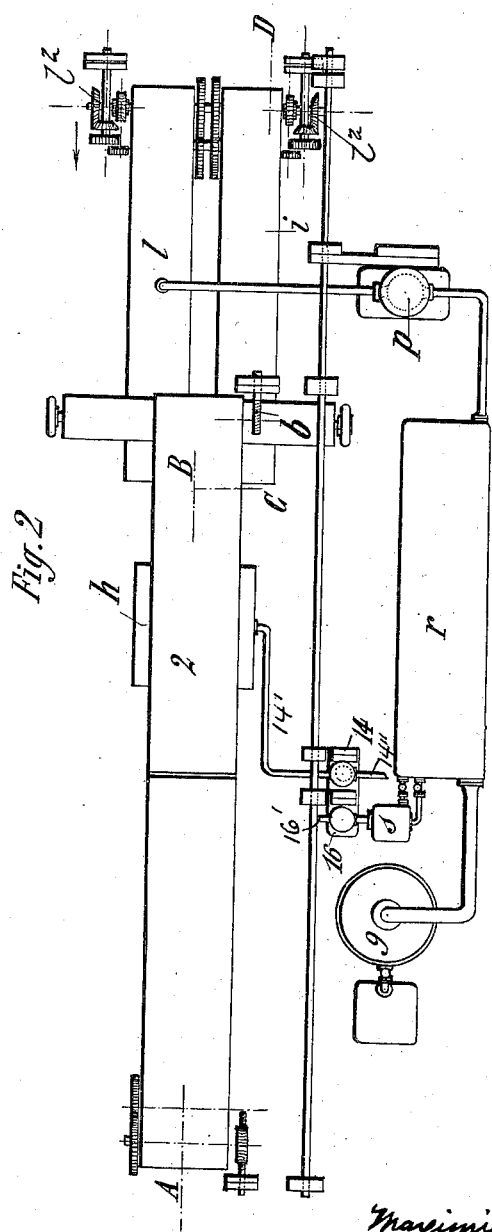

No. 656,695.      Patented Aug. 28, 1900.
M. A. JACQUES.
APPARATUS FOR DEGREASING WOOL.
(Application filed Feb. 24, 1900.)
(No Model.)      3 Sheets—Sheet 3.
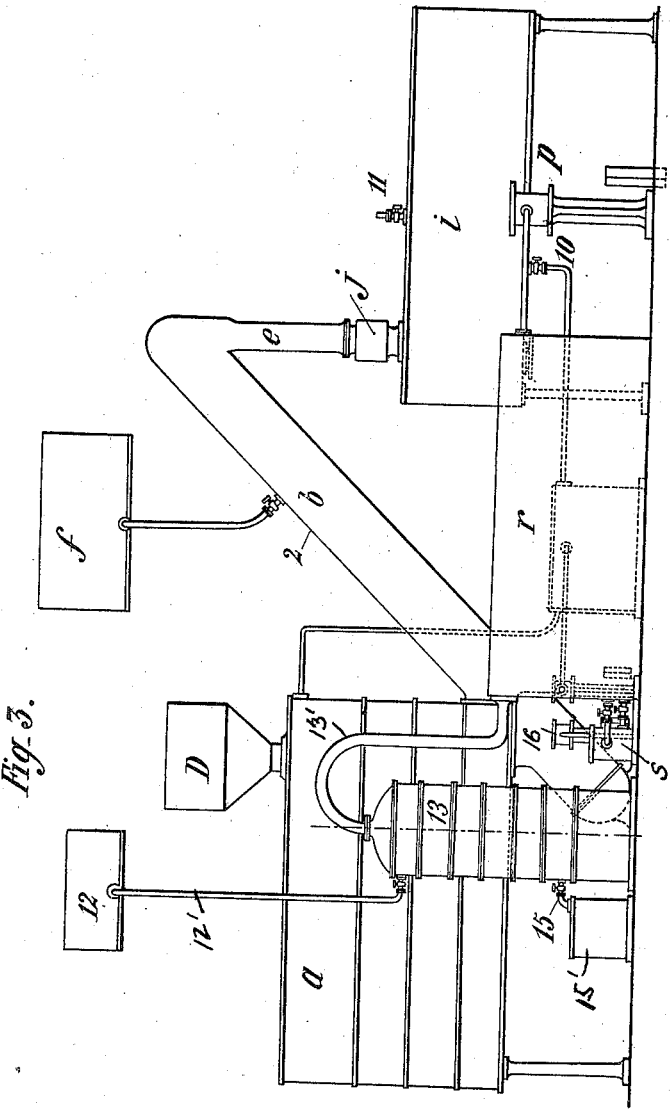

UNITED STATES PATENT OFFICE.

MAXIMILIEN AUGUSTE JACQUES, OF SALOME, FRANCE.

APPARATUS FOR DEGREASING WOOL.

SPECIFICATION forming part of Letters Patent No. 656,695, dated August 28, 1900.

Application filed February 24, 1900. Serial No. 6,389. (No model.)

*To all whom it may concern:*

Be it known that I, MAXIMILIEN AUGUSTE JACQUES, of Salome, Nord, in the Republic of France, have invented certain new and useful Improvements in Apparatus for Degreasing or Scouring Wool; and I do hereby declare the following to be a full, clear, and exact description of the invention, such as will enable others skilled in the art to which it appertains to make and use the same.

The invention which forms the subject of the present application for patent relates to improvements in apparatus for the continuous and methodical degreasing or scouring of wool.

In my apparatus the scouring is effected by solution; and the essential characteristic feature of my invention consists in a mechanical arrangement by which the wool is conveyed regularly and continuously in thin layers through the solvent, which circulates in the opposite direction, this arrangement avoiding, contrarily to all those hitherto employed, matting and felting of the wool in the scouring-vats and making it possible, besides, after perfect scouring, to recover nearly all the solvent employed.

My invention is shown in detail in the accompanying drawings, in which—

Figure 1 is a general longitudinal section, along A B C D of Fig. 2, of the complete plant. Fig. 2 is a plan corresponding to Fig. 1. Fig. 3 is a general longitudinal elevation of the plant corresponding to Fig. 1. Fig. 4 is a transverse section along the plane indicated by E F in Fig. 1.

The extracting apparatus consists of a vessel $a$, preferably of sheet-iron and cast-iron. In this vessel perforated belts $c$ are arranged, passing around rollers $c^\times$. These belts move in the direction of the arrows. A hopper is shown at $d$, the discharge-opening from which opens into the casing $a$, so as to discharge the wool onto the uppermost of the belts $c$.

$b$ is an inclined conveyer the lower end of which extends below the casing $a$. This conveyer is inclosed in a casing 2, which has an opening at $b^\times$ communicating with the casing $a$ at its lower end. The conveyer is provided with ribs $b'$, preferably of galvanized sheet-iron.

$f$ is a tank containing a solvent, (spirit of petroleum, sulfuric ether, or some hydrocarbon,) and this tank connects by a pipe 3 with the casing of the conveyer, so that the said casing and also the vessel $a$ may be filled with the solvent up to the level shown in the drawings. Baffle-plates 4 are arranged in the vessel $a$ and attached to the sides, so as to cause the solvent to flow in a direction opposite to the direction of movement of the belts.

$h$ is a vat connected with the vessel $a$ at 5 by a pipe 6.

$e$ is a distributing-funnel connected with the upper end of the conveyer-casing and depending therefrom.

8 is a register or shutter pivotally supported at its lower edge to close either one or the other of the divergent spouts $e'$ of the funnel $e$. Below these spouts are arranged vessels $i$ and $l$. A valve $j$ controls the passage between the spout $e'$ and the chamber $i$, and a similar valve 9 controls the passage between the spout $e$ and the chamber $l$. Belts 7 are arranged in these vessels, passing around rollers $7^a$ in opposite directions. The vessels $i\ l$ are supported upon suitable standards—such, for instance, as shown at $x$, Fig. 4—and similar standards support the vessel $a$. The rollers $7^a$ are driven through any suitable form of driving-gearing, (indicated generally by the letter $l^2$, Fig. 2.)

The pump in Fig. 3 and vat have been marked, respectively, 16 and S.

$k$ is an outlet arranged in the bottom of the chamber or vessel $i$, and a similar outlet is provided in the chamber or vessel $l$.

$10'$ is a pipe leading to the vat $h$, and this pipe has branches at $10^\times\ 10^\times$, leading through taps 10 10 into the chambers $i$ and $l$, respectively.

11 is a tap connected with any suitable air-pump, such as is shown in Fig. 2 at $p$, and each of the vessels $i\ l$ has such a tap.

$r$ is a condenser connected with the air-pump $p$, and $s$ is a vat connected with the condenser $r$.

14 is a pump connected by a pipe $14'$ with the vat $h$ and by another pipe $14''$ with the vat 12. The vat 12 is connected with a distilling apparatus 13 by a pipe $12'$.

15 is a tap and pipe connecting the bottom of the distilling apparatus with a receptacle 15. A pipe $13'$ connects the top of the distilling apparatus with the condenser $r$. The vat $s$ is connected with the tank $f$ through a pump 16 by means of a pipe 16'.

The operation is as follows: The wool falls from hopper $d$ upon the upper belt $c$ and is passed from belt to belt and carried through the solvent until it is discharged onto the conveyer $b$, and is carried up through the solvent by this conveyer to be discharged down through the funnel $e$. The solvent passes in the opposite direction to that of the wool, and it becomes loaded with fat when discharged at 5 from the vessel $a$. From this point the solvent flows to the vat $h$. The wool thus freed from fat, but still impregnated with solvent, is discharged through the funnel $e$ into either one or the other of the chambers or vessels $i\ l$. Let us suppose that we empty the wool into vessel $i$. It will be carried along in the direction of the arrows. When the material has reached the extremity—that is to say, near the outlet $k$—the belts 7 are brought to a standstill, and after having reversed the register, so as to make it rest on the opposite side of the funnel, the wool will be conveyed into vessel $l$. Valve $j$ is then shut so as to separate the filled vessel $i$ from the other part of the extraction apparatus. The liquid has been drained during filling by tap 10 and pipe 10' and been collected in vat $h$. After having shut 10 and opened tap 11, Fig. 1, a vacuum is made in vessel $i$ by means of the air-pump $p$ to cause evaporation of the solvent with which the wool is yet impregnated. The discharge-valve $k$ is then opened and the belts 7 are set in motion, which empty the vessel $i$. During this time vessel $l$ has been filled. Then shut the valve $k$, adjust the register 8, and open the sluice-valve 9, which operates on vessel $l$ in the same way as just done in the case of the vessel $i$. The air-pump $p$ forces the gaseous solvent into a condenser $r$, Fig. 2, which condenses it and conveys it to vat $s$. The solution of fatty substance is driven by a pump 14 into a vat 12, which feeds the distilling apparatus 13. The fatty substance passes out into 15, and the recovered solvent condensed in the condenser $r$ flows off into vat $s$ and is conveyed to tank $f$ by the pump 16. Thence it again runs off into the extraction apparatus $a$.

The details of construction of my apparatus may vary. Thus the carrying-belts may be formed of bands consisting of assembled chains, the characteristic of my arrangement being always a continuous conveyance, causing the wool to circulate in thin layers in the scouring liquid moving in the opposite direction.

I claim—

In combination in an apparatus for scouring wool, a washing vessel $a$, carrier-belts therein moving in opposite directions, baffle-plates between the belts, a pair of vessels to which the material is passed from the washing vessel, a casing and a carrier arranged between the said washing vessel and the pair of vessels, said casing terminating in a funnel, and a hinged register in the said funnel by which the casing and carrier can be placed in communication with either one of the pair of vessels, substantially as described.

In witness whereof I have hereunto set my hand in presence of two witnesses.

MAXIMILIEN AUGUSTE JACQUES.

Witnesses:
LOUIS GARDET,
EDWARD P. MACLEAN.